United States Patent
Edmonds et al.

(10) Patent No.: US 11,080,820 B2
(45) Date of Patent: Aug. 3, 2021

(54) SYSTEM AND METHOD FOR DISPLAYING A PORTION OF AN IMAGE DISPLAYED ON A SCREEN ON A DISPLAY OF A MOBILE DEVICE IN MAGNIFIED FORM

(71) Applicant: DISPLAYLINK (UK) LIMITED, Cambridge (GB)

(72) Inventors: Timothy Mark Edmonds, Castelnau-le-Lez (FR); Rebecca Ann Edney, Willingham (GB)

(73) Assignee: DISPLAYLINK (UK) LIMITED, Cambridge (GB)

( * ) Notice: Subject to any disclaimer, the term of this patent is extended or adjusted under 35 U.S.C. 154(b) by 399 days.

(21) Appl. No.: 15/537,730

(22) PCT Filed: Dec. 8, 2015

(86) PCT No.: PCT/GB2015/053762
§ 371 (c)(1),
(2) Date: Jul. 2, 2018

(87) PCT Pub. No.: WO2016/097694
PCT Pub. Date: Jun. 23, 2016

(65) Prior Publication Data
US 2019/0172177 A1  Jun. 6, 2019

(30) Foreign Application Priority Data
Dec. 19, 2014  (GB) ..................................... 1422824

(51) Int. Cl.
*G09G 5/00* (2006.01)
*G06T 3/40* (2006.01)
(Continued)

(52) U.S. Cl.
CPC .............. *G06T 3/40* (2013.01); *G06F 3/1454* (2013.01); *H04N 21/4126* (2013.01); *H04N 21/43637* (2013.01); *H04N 21/4728* (2013.01)

(58) Field of Classification Search
CPC ........................... H04N 21/41; H04N 21/4728
See application file for complete search history.

(56) References Cited

U.S. PATENT DOCUMENTS

2013/0234934 A1* 9/2013 Champion ............ G06F 3/0304
345/156
2013/0329114 A1  12/2013 Byoungju et al.
(Continued)

FOREIGN PATENT DOCUMENTS

| CA | 2310945 A1 | 12/2001 |
| WO | 2013103968 A2 | 7/2013 |
| WO | 2014074111 A1 | 5/2014 |

OTHER PUBLICATIONS

EPO, International Search Report and Written Opinion for corresponding PCT/GB2015/053762 dated Feb. 15, 2016, pp. 1-9.
(Continued)

Primary Examiner — Weiming He
(74) Attorney, Agent, or Firm — Haynes and Boone, LLP

(57) ABSTRACT

A method of displaying a portion of an image (13) on a mobile device (15b) having a screen by communicatively coupling the mobile device (15b) to a computer device (11) displaying an image (13) on a display (12) under the control of the computer device (11), receiving image data relating to the image (13) from the computer device (11), and displaying an area (16b) of the image (13) on the screen of the mobile device (15b), the area (16b) having a magnification factor compared to the image (13). The magnification factor may be selected by the user according to the level of detail that is required and therefore allows the user to view the magnified area (16b) more privately, which may be appro-
(Continued)

priate in a presentation context where a member of the audience has difficulty seeing the screen and wishes to instead view the presentation or magnified sections of it on a hand-held device.

18 Claims, 4 Drawing Sheets

(51) Int. Cl.
*H04N 21/41* (2011.01)
*H04N 21/4728* (2011.01)
*H04N 21/4363* (2011.01)
*G06F 3/14* (2006.01)

(56) References Cited

U.S. PATENT DOCUMENTS

2014/0036149 A1 2/2014 Shuta et al.
2014/0152665 A1* 6/2014 Lu .................. G06Q 10/101
345/440

OTHER PUBLICATIONS

Great Britain, Patents Act 1977: Search Report under Section 17(5) for application No. GB1422824.1 dated Jun. 23, 2015.

* cited by examiner

SYSTEM AND METHOD FOR DISPLAYING A PORTION OF AN IMAGE DISPLAYED ON A SCREEN ON A DISPLAY OF A MOBILE DEVICE IN MAGNIFIED FORM

RELATED APPLICATION DATA

This application is a national phase application of International Application No. PCT/GB2015/053762 filed Dec. 3, 2015 and published in the English language.

BACKGROUND OF THE INVENTION

The invention relates to a display system, method and devices to enable remote viewing of at least a portion of an image on a mobile device.

It is known for a computing device, such as a PC or laptop, to be attached to a display device such as a monitor or projector or a collection or combination of monitors or projectors so that it can provide a visual interface with which a user can interact. Depending on the programs being executed by the Computer, the display device may show different images, which may include text and/or documents, a picture or collection of pictures, a moving video or any other visual data. However, due to the size constraints of the display device, large images must usually be scaled so that they fit on the screen of the display device and this may result in details of the image being too small for a user to see them. For this reason, it is useful to be able to magnify an image on a display device in the same way as a magnifying glass may be used on a physical object. This is especially true in the field of assistive technology, for users who may have difficulty viewing small objects due to visual impairment.

In current technology, there is a known facility whereby a user can 'zoom in' on an Image. This means that a section of the image is displayed on the display device, scaled such that the whole of that section appears on the display device, rather than the whole of the image. This means that details can be shown at a larger size, but only a part of the image is visible. This may not be desirable where, for example, a user wishes to compare two sections of an image. It also generally only applies to a single application, which is not helpful when a user needs to view multiple applications with greater magnification.

There are also known applications that provide a virtual 'magnifying glass' that appears on the display device, rendered so as to appear to be in front of the image. An area under the centre of the 'magnifying glass' is then magnified and the 'magnifying glass' may be moved around as the user chooses. However, only a portion of the image is magnified and the area around that section is obscured by the rest of the 'magnifying glass'. This may not be suitable for viewing images where the context of the magnified section is relevant. It is also unsuitable where there are multiple users viewing the image but only one user requires the magnification of an area. Some virtual 'magnifying glasses' are also designed to mimic glass lenses by distorting the magnified image, which may be unsuitable for text or images where detail is important.

A third example of magnification of an image that is known is loupe windows. These are separate windows that show a section of the image suitably magnified. The window appears on the same display device as the image and obscures the image, but can be moved about, including to other display devices that share the same extended desktop. However, if the user wishes to make use of all of his or her display device space then the loupe window will inevitably obscure part of the image. The section of the image that is displayed in the loupe window also cannot be interacted with through the loupe window and the loupe window may not update. This means that the user must interact with the full image, which may be difficult to do, especially in the case of assistive technology where the user may find it difficult to interact with a small or intricate image.

Furthermore, all of these known examples require the magnified image to be on a display device that is attached to the computing device and may be at a distance from the user. There can also only ever be one magnified section of the image, which means that different users cannot view different sections of a large image and different magnified sections cannot be compared to one another.

It is possible using known technology for a presenter to share an image with other users involved in a video conference where the other users are viewing their own display devices at a different location. However, this will not be suitable for all circumstances where a user may wish to view a magnified area of the image. It requires a video conference to be in progress and therefore will not be useful for a single user who wishes to view a section of an image on his or her own display device. It will also not be suitable for an audience member who is physically present for a presentation as a video conference is likely to include audio output that may disturb other audience members. Finally, the shared desktop function that is available in most video conferencing software does not allow for magnification of the shared image and is therefore not helpful for users who wish to view a magnified version of the image.

SUMMARY OF THE INVENTION

According to a first aspect of the invention, there is provided a method of displaying a portion of an image on a mobile device having a screen, the method comprising:
  communicatively coupling a mobile device to a computer device displaying an image on a display under the control of the computer device;
  receiving image data relating to the image from the computer device;
  displaying an area of the image on the screen of the mobile device, the area having a magnification factor compared to the image.

The mobile device preferably has an internal screen and independent methods of input, and may be a tablet computer, laptop, wearable device or smartphone. The mobile device may be connected to a computer device (which may itself be a mobile device but will be referred to herein as a computer device for clarity).

The fact that the magnified area is displayed on a separate screen means that no part of the image will be distorted or obscured, as occurs with known methods. The use of a mobile device takes advantage of a device that the user is likely to already have with him or her, since most people carry mobile devices, such as smartphones. A mobile device is likely to also have inbuilt connection capabilities, which will render it unnecessary to provide a further display, and the fact that a mobile device is likely to be a handheld device means that it can be moved about as may be most convenient for the user. For example, it could be moved closer to the user's face or held up next to the image on the display to allow a comparison. Furthermore, it will enable the user to view the magnified area more privately, which may be appropriate in, for example, a presentation context where a member of the audience has difficulty seeing the screen and wishes to instead view the presentation or magnified sections of it on a hand-held device.

This aspect of the invention is likely to be useful not only in general display fields, but also in assistive technology as it will enable users who may have vision difficulties to view magnified sections of an image without interfering with the image as a whole, thus avoiding inconvenience for other users and embarrassment for the user with the vision difficulties.

Advantageously, the magnified area may be any section of the image, of any size, up to and including the entire image. This is beneficial because it will allow the whole of the image or any section of it to be viewed on a handheld device, according to the circumstances and the needs of the user.

Advantageously, the mobile device may display the magnified area at any magnification factor, including 100% and magnification factors greater and less than 100%. This will allow for different magnified areas to be viewed at different magnifications.

Preferably, the magnification factor at which the magnified area is displayed on the mobile device may be selected by the user. This would allow the user to select the magnification factor he or she requires in order to view the image at the level of detail that he or she requires.

An alternative method may be provided whereby the magnification factor of the magnified area is set automatically when the area to be magnified is selected by the user. This is beneficial because it would allow the user to instead view a specific magnified area magnified to the resolution necessary to be viewed most conveniently on the mobile device.

Preferably, the image data that comprises the magnified area may be updated when there is an update to the image. This would mean that the user would be able to view an up-to-date version of the image at all times rather than being restricted to a screenshot taken at the beginning of the operation.

Preferably, the user is able to interact with the magnified area and any changes that he or she may make are reflected in the image. This allows the user to make changes to a magnified version of the image, which may be appropriate where the magnified area is part of a very large or detailed image that would otherwise be very difficult to edit accurately.

In one embodiment, multiple mobile devices may be connected to the computer device, if there is more than one user who wishes to view a magnified area of the image.

Preferably, in the case where multiple mobile devices are connected to the computer device, each Mobile may display a different magnified area. This would be beneficial in a context where there are multiple users viewing a large image where they may all be interested in different areas of the image. It will also be useful if one or more users wish to compare different magnified areas of the image, as it would allow two or more mobile devices to be connected to the computer device and compared.

Preferably, in the aforementioned case, the user of each mobile device may interact with the specific magnified area displayed on his or her mobile device as hereinbefore described with reference to a single mobile device. This would allow multiple users using mobile devices to view different sections of the image so that they would all be able to make edits without any one of them needing to monopolise the computer device or even being in the same location as the computer device.

Preferably, in the aforementioned case, the user of each mobile device may see changes made by other users to his or her magnified area as hereinbefore described. This would be especially useful where multiple users are making edits to a document displayed in the image and one or more are using the present technique to view sections of the image as it means that they will be aware of changes made by the other users.

In one embodiment, if a preselected overriding event occurs, the mobile device would be disconnected from the computer device. Examples of possible overriding events include an incoming call to a smartphone or the available battery power of the mobile device dropping below a preselected threshold. This would allow for the connection to be interrupted by other events, as appropriate.

Preferably, when a mobile device is disconnected due to an overriding event, once the circumstances of the overriding event have ended the mobile device reconnects. It may ask the user to reconfigure the magnified area or it may be able to access stored settings and restore them. This would be beneficial because it would mean that overriding events cause minimal disruption so that the user can continue to view the magnified area once he or she has dealt with the overriding event, as may be appropriate.

According to a second aspect of the invention, there is provided a computer device comprising:
  display control means configured to display an image on a display coupled to the computer device;
  communication means configured to communicatively couple to a mobile device and to receive, from the mobile device, a selection of a location of the area of the image and a magnification factor for the area compared to the image; and
  a processor configured to process the image based on the selection and to provide image data comprising the area at the selected location and magnification factor to the communication means;
  wherein the communication means is configured to transmit the image data to the mobile device, to enable the mobile device to display the area of the image on its screen, the area having the magnification factor.

The arrangement of the computer device may comprise installation of specific software or it may be embodied in hardware or firmware built into the computer device at manufacture. There may also be a limit on the number of mobile devices that can be connected, which may be enforced by, for example, the number of ports available in a hardware embodiment. It may also be beneficial in a software embodiment to limit the number of mobile devices that can be connected in order to limit the processing power required on the computer device in order to service all of the connections. Alternatively, there may simply be a limit on the number of magnified areas such that later users must view magnified areas chosen by earlier users.

Preferably, the computer device is connected to an interface system that includes a cursor which is controlled via a user-interface device and the magnified area is centred on and moves with this cursor. This provides an intuitive method of moving the magnified area to a location of interest and will also allow the magnified area to follow the user's main focus.

Preferably, the computer device is arranged so as to receive input from one or more mobile devices and change stored data and/or the image accordingly.

Preferably, the computer device is arranged to perform all appropriate cropping and scaling of image data before transmitting it to the mobile device or devices. This will minimise the processing needed on the mobile device or devices, which would be beneficial as most mobile devices run on battery power and reduction of processing will have the effect of minimising battery use. If image data is scaled and cropped before transmission, it will also reduce the bandwidth needed to service all of the connections.

Alternatively, the second aspect of the invention may provide a computer device comprising:
 display control means configured to display an image on a display coupled to the computer device;
 communication means configured to communicatively couple to a mobile device and to transmit image data relating to the image to the mobile device, the image data enabling the mobile device to display an area of the image on its screen, the area having a magnification factor compared to the image, wherein the communication means is configured to receive display data from the mobile device, wherein the display data comprises at least one of:
  a visual indicator indicating a location of an area of the image selected by a user of the mobile device; and
  an update to an area of the image, the update being input by the user to the mobile device to the change at least part of an area of the image; and
 means for updating the image on the display based on the display data.

Preferably, the communication means may be configured to receive, from the mobile device, a selection of a location of the area of the image and the magnification factor for the area. Furthermore, the computer device may further comprise a processor configured to process the image based on the selection to provide the image data comprising the area at the selected location and magnification factor to be displayed on a screen of the mobile device.

According to a third aspect, there is provided a mobile device comprising a processing system, a user interface and a display screen, the mobile device being configured to perform the method described above.

The arrangement may take the form of an application installed on the mobile device, or alternatively the invention may be embodied in hardware and/or firmware installed in the Mobile at manufacture.

Preferably, the mobile device is further arranged so as to receive input from the user and transmit it to the computer device.

Advantageously, the mobile device may also be arranged to automatically disconnect from the computer device upon the occurrence of an overriding event.

Advantageously, the mobile device may further be arranged to automatically reconnect to the computer device upon the end of an overriding event that caused it to disconnect.

Advantageously, the mobile device may be further arranged to store settings relating to the magnified area such as size, magnification and position and to restore those settings upon reconnection.

According to a fourth aspect of the invention, there is provided system comprising:
 a computer device as described above; and
 at least one mobile device as described above.

BRIEF DESCRIPTION OF THE DRAWINGS

An embodiment of the invention will now be more fully described, by way of example, with reference to the drawings, of which.

DETAILED DESCRIPTION OF THE DRAWINGS

Figure 1:
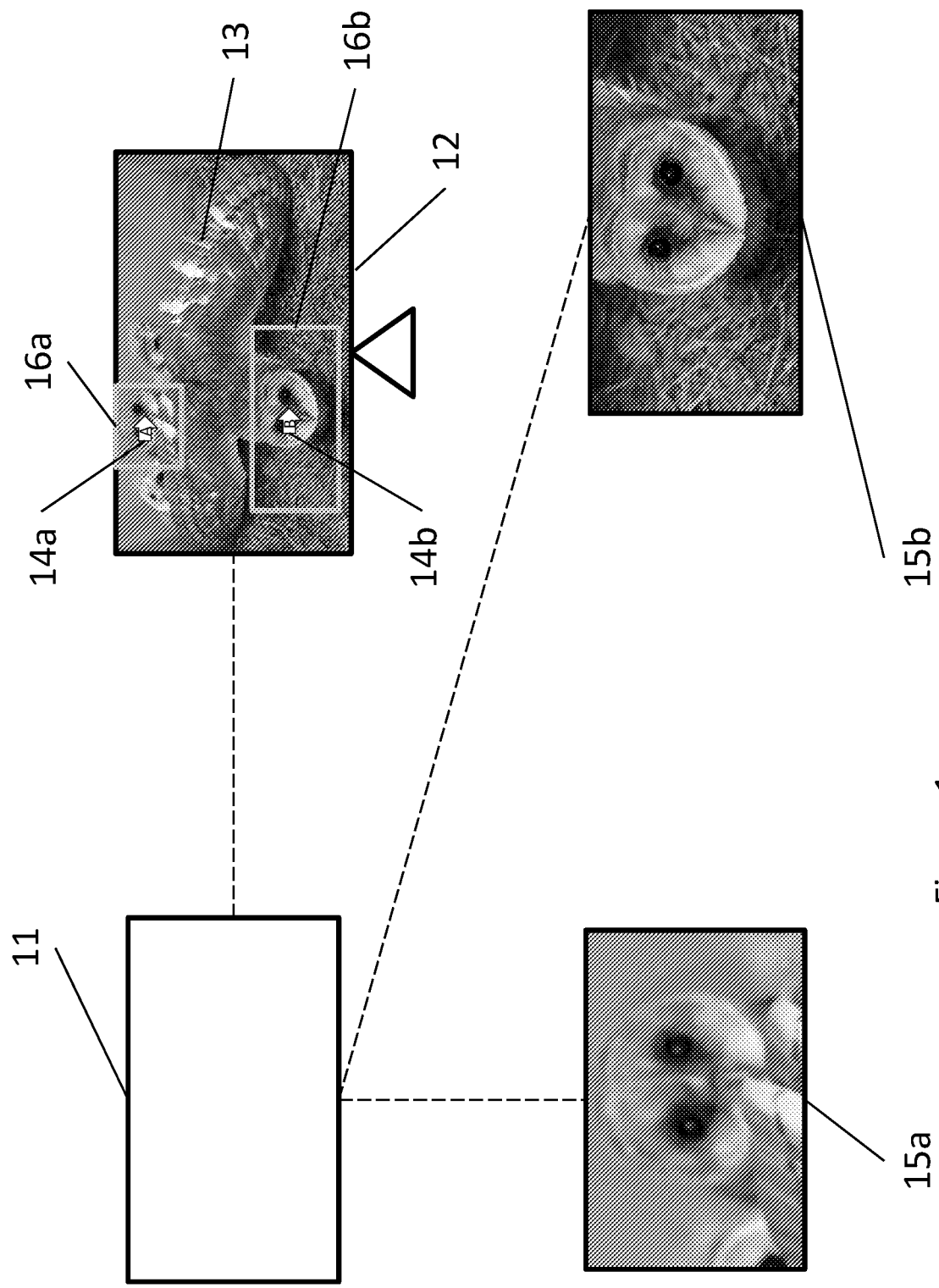
FIG. 1 shows a general embodiment of the invention including two mobile devices connected to a computer device and displaying different magnified areas of an image shown on a display coupled to the computer device.

Thus, as shown in FIG. 1, a computer [11], which in this embodiment is a desktop PC, is connected wirelessly to two mobile devices [15], which may be the same type of device or different types of devices. In this embodiment, one mobile device [15a] is a head-mounted display and the other mobile device [15b] is a smartphone. The wireless connection may be via Wi-Fi or any other appropriate wireless connection. The computer [11] is also connected to a monitor [12], which shows an image [13]. The two mobile devices [15] are used by separate users, each able to control a cursor [14] which is visible on the monitor [12]. Each cursor [14] is labelled with the identity of the user that is controlling it: "A" (for the user of the head-mounted display [15a]) and "B" (for the user of the smartphone [15b]). The users may control the cursors [14] via some input from the mobile devices [15] or through other input devices such as external mice.

Each cursor indicates the location of a section [16] of the image [13] that the particular user of each mobile device [15] wishes to view on his or her mobile device [15]. Each section [16] is shown in FIG. 1 using a pale-grey rectangle for the sake of clarity, but this outline need not be shown on the monitor [12] as it would distract from the image [13]. Of course, if desired, particularly if there is only one mobile device [15] coupled to the computer device [11], then an outline of the section [16] to be magnified could be shown on the image [13] on the monitor [12]. Each section [16] is centred on its respective cursor [14] and will move with it. This means that the two users may view different areas of the image [13] independently of one another and without interfering with the image [13]; other users would be able to view the image [13] on the monitor [12].

As shown, each section [16] can have a different magnification factor applied to it, so that each mobile device [15] can display the selected areas of the image [13] at different magnifications.

Figure 2:
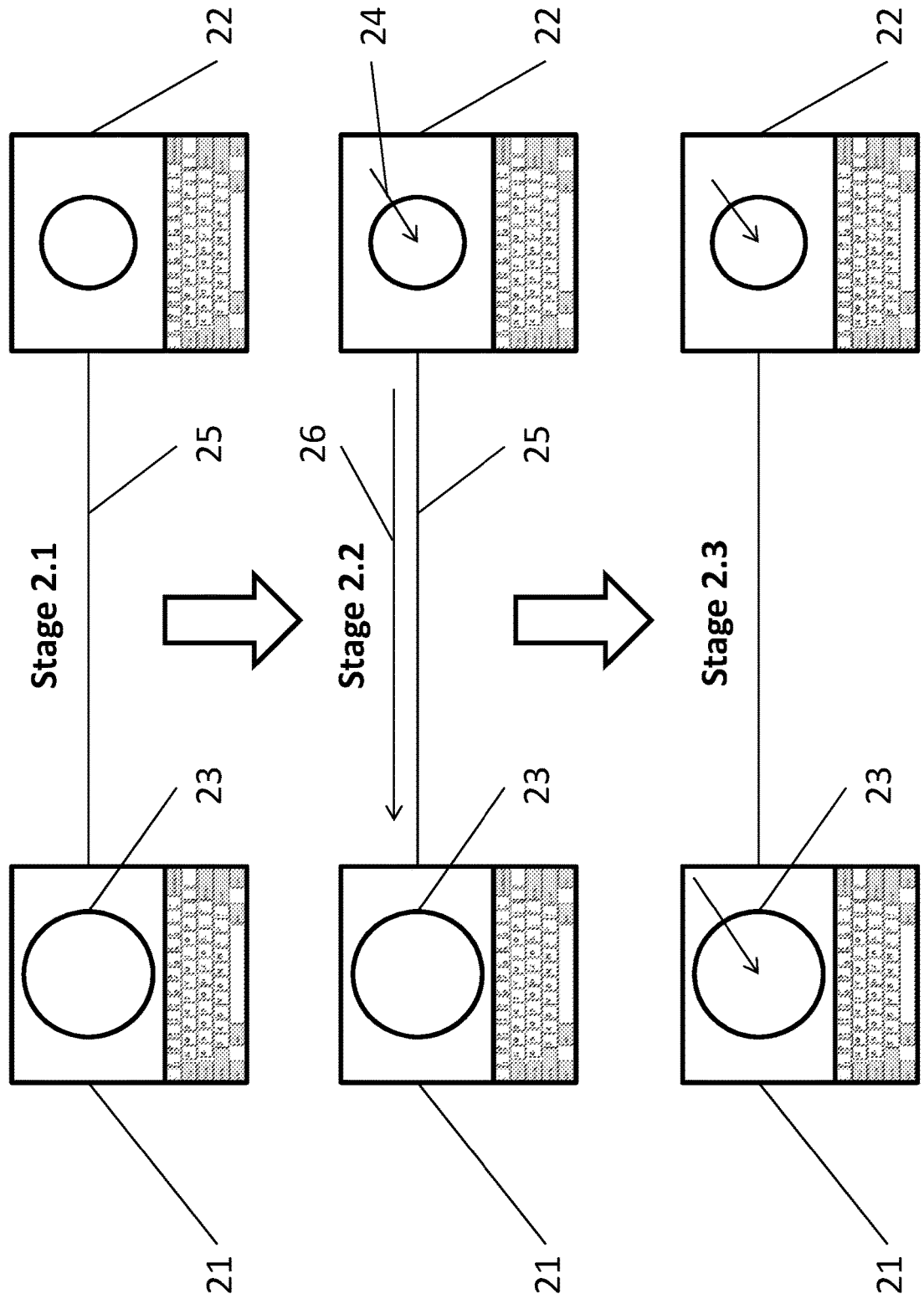
FIG. 2 shows an embodiment of various stages in a process whereby the image is updated through the user's interaction with a mobile device.

As shown at Stage 2.1 of FIG. 2, a computer device [21], which in this example is a laptop, is connected to a mobile device [22], which in this example is also a laptop, across a network connection [25]. The computer device [21] displays an image [23] (shown as a circle) and the mobile device views an area of the image [23]. In this case, the area consists of the whole of the image at a magnification factor of less than 100%, so that the image displayed on the internal screen of mobile device [22] comprises the whole of the image [23], but zoomed out so that it appears smaller.

In Stage 2.2, the user of the mobile device [22] edits the image displayed on the mobile device [22] by drawing an extra line [24] (shown as an arrow). This new data is sent to the computer device [21] across the network connection [25], as shown by the indication of data transfer [26]. It may be sent as raw input data, rendered image data or data compressed or encrypted in any appropriate manner.

In Stage 2.3 of FIG. 2, the computer device [21] changes the image [23] to reflect the changes made on the mobile device [22], so that the arrow is also shown on the image [23] but in the appropriate proportions relative to the circle, as were made on the mobile device [22].

Figure 3:
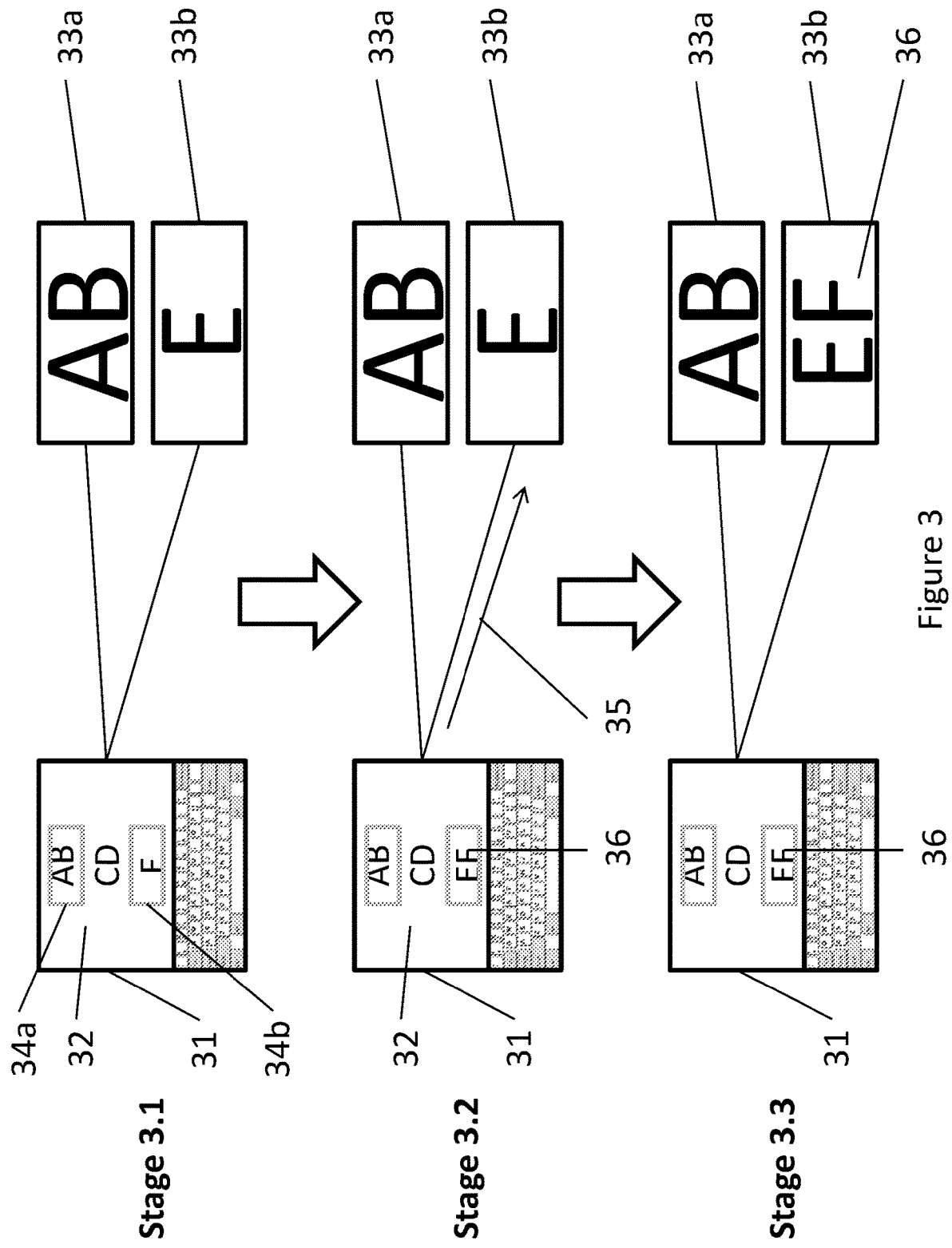
FIG. 3 shows an embodiment of various stages in a process whereby two mobile devices receive updated image data from the computer device.

As shown in Stage 3.1 of FIG. 3, a computer device [31], which in this example is a laptop, is connected to two mobile devices [33], which in this example are both tablet computers [33*a* and 33*b*]. The laptop [31] displays an image [32] consisting of a word processing document containing some text and is able to accept input from its own internal keyboard. The two mobile devices [33*a* and 33*b*] each have their own magnified areas [34*a* and 34*b*] on the image [32], which are again shown as grey rectangles (although in practice they may be invisible) in FIG. 1. In this particular embodiment the magnified areas [34*a* and 34*b*] are not moved via user interaction with a cursor. They are instead moved by scrolling the images displayed on the mobile devices [33*a* and 33*b*].

As shown in Stage 3.2, a user types more text [36] (for example the letter "F") on the computer device [31] and it is displayed on the internal screen of the computer device [31]. Only one [33*b*] of the mobile devices is being used to view this particular area of the image [32] in which the text [36] has appeared, so new image data [35] is only sent to this mobile device [33*b*]. The image data [35] may be transmitted as part of a constant stream of image data or may be sent as a change to a cached image stored on the mobile device [33*b*], depending on the specific embodiment.

In Stage 3.3, the new text [36] is shown as being displayed on the appropriate mobile device [33*b*].

Figure 4:
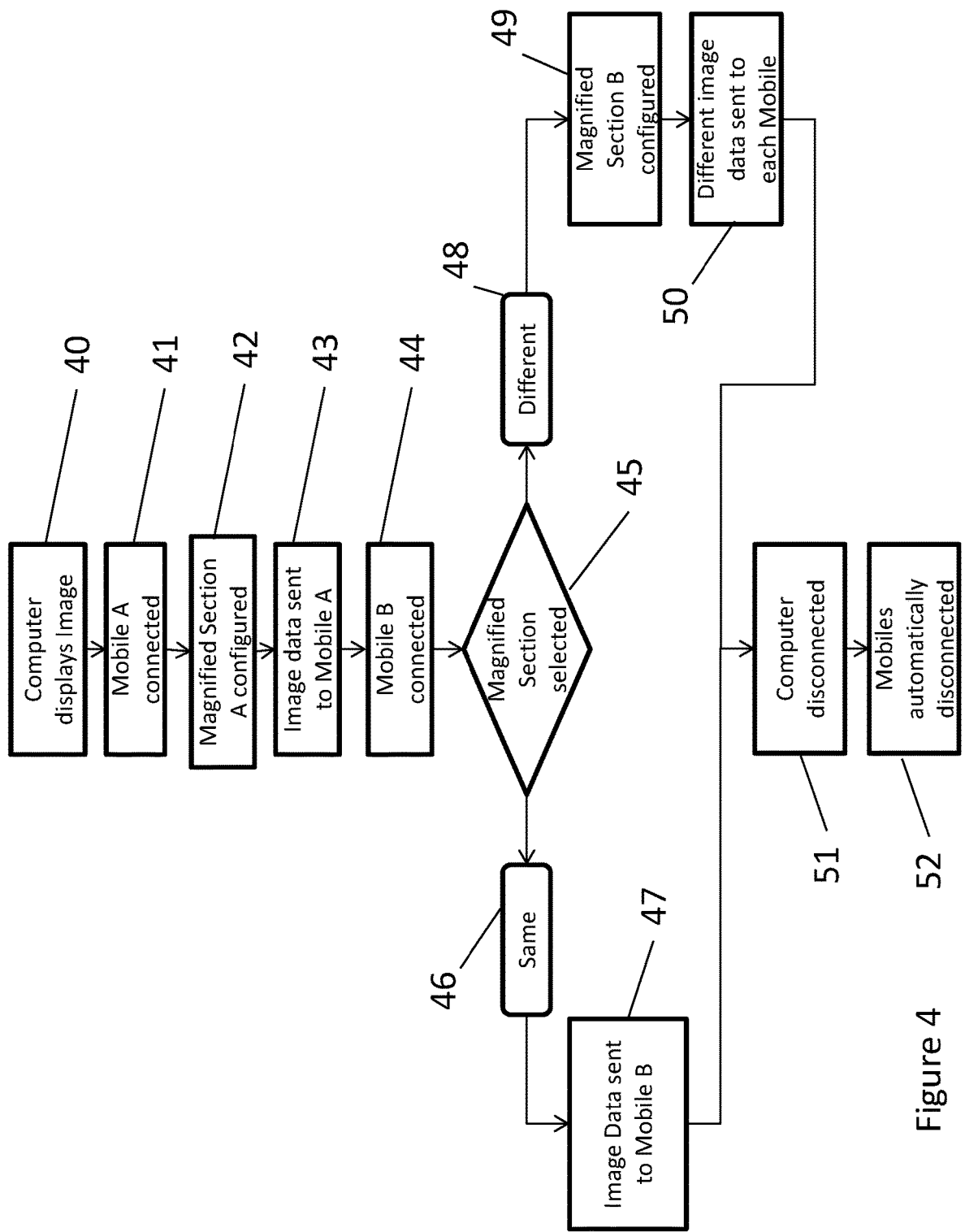
FIG. 4 shows an example flowchart of the process of FIGS. 2 and 3.

FIG. 4 shows a flowchart of an example of the system in use. In this example, a computer device is being used to give a presentation and two mobile devices (Mobile A and Mobile B) are connected to it in order to display sections of the image that comprises the presentation. The computer device and both mobile devices have appropriate software installed and are configured such that the computer device can transmit image data to the mobile devices. In this embodiment, each magnified area is controlled by the movement of an assigned cursor, each of which is controlled from the associated mobile device.

Thus, as shown, at Step 40, the presentation begins and the Computer displays the image required by the presentation. At this point there are no other devices connected to it; there is only the Computer and an associated monitor, as shown in the system in FIG. 1.

At Step 41, a first Mobile A is connected to the Computer. This may be by a wired method such as a USB cable, or a wireless method such as Wi-Fi. In either case, there will be an appropriate handshaking procedure whereby the two devices are connected, so that they are able to communicate with one another. Either in response to user input, or automatically, Mobile A then sends a signal to the Computer requesting that the Computer transmit display data to it. The Computer signals in response that it has appropriate software installed and requests details of the data to be sent.

At Step 42, configuration of the section of the image requested by Mobile A takes place. This is preferably done through user input: for example, the user may select a position for an associated cursor and the size of the desired section to form a magnified area. Alternatively, he or she may be offered an option to use a cursor controlled by the Computer. The magnified area may be configured by size, desired magnification factor, or a combination of the two. It is also possible for the configuration data to be saved or selected automatically by the Mobile A. The configuration data is sent to the Computer and the Computer is then able to collect the appropriate image data and send it to Mobile A, as shown at Step 43. The image data may be selected, controlled and amended as described above.

At Step 44, a second Mobile B is connected. This may also be by a wired method, such as USB, or a wireless method, such as Wi-Fi, and the two devices will communicate as appropriate for the connection. As with Mobile A, Mobile B requests image data from the Computer, which in turn requests the same configuration data as it did with Mobile A. The exception to this is if the Computer has a limit on the number of magnified areas it is able to supply; it may, instead of asking for configuration data, simply request confirmation of which magnified area that is already available Mobile B will use.

At Step 45, there is a choice. Mobile B can either use the same magnified area as Mobile A, which has already been configured by and is controlled by the user of Mobile A, or it can use its own magnified area (provided that the Computer is able to supply a different magnified area, as mentioned above).

If Mobile B chooses to view the same magnified area as Mobile A, as indicated by step 46, no further configuration is necessary and the process follows the left-hand branch through Step 47. In this case, if Mobile A were disconnected, Mobile B could take over control of the magnified area, or it could also be automatically disconnected, or the Computer could send it a signal requesting reconfiguration of the magnified area.

If Mobile B chooses to view its own magnified area, shown by step 48, this must be configured and the process follows the right-hand branch to Step 49, where the magnified area—hereinafter referred to as magnified area B—is configured. This would be done in the same way as the existing magnified area: magnified area A. However, magnified area B would be entirely independent, controlled through an individual cursor and receiving different display data at Step 50. If Mobile A were to be disconnected, Mobile B would be unaffected.

Both options result in the same behaviour if the Computer is disconnected, as shown at Step 51. The disconnection acts as a signal to the mobile devices that they will no longer be receiving display data and they should react according to the specific embodiment, perhaps by displaying an error message to the user or simply terminating the application that was receiving and displaying the data. In any case, the disconnection of the Computer also results in the termination of the connection between the Computer and the mobile devices, as shown in step 52.

Although only a few particular embodiments have been described in detail above, it will be appreciated that various changes, modifications and improvements can be made by a person skilled in the art without departing from the scope of the present invention as defined in the claims. For example, hardware aspects may be implemented as software where appropriate and vice versa.

The invention claimed is:

1. A method of displaying a portion of an image on a mobile device having a screen, the method comprising:
    communicatively coupling the mobile device to a computer device displaying the image on a display under the control of the computer device;
    receiving an input of a location and a size of an area of the image from a user of the mobile device, the area being smaller than the image, the location and the size being transmitted from the mobile device to the computer device and being displayed as a visual indicator under the control of the user of the mobile device on the image on the display under the control of the computer device;

receiving image data relating to the image from the computer device;

displaying the area of the image on the screen of the mobile device, the displayed area having a magnification factor of less than one or more than one compared to the image;

receiving a user input to make a change to a content of the image being displayed on the displayed area having the magnification factor on the screen of the mobile device;

transmitting, from the mobile device to the computer device, information relating to the change of the content of the image; and updating the image on the display to display the content changed by the user of the mobile device,
wherein a different portion of the updated image is viewable by a different user on a screen of a different mobile device communicatively coupled to the computer device, and
wherein the portion of the image viewable by the user and the different portion of the image viewable by the different user are each outlined by a different rectangular box on the display.

2. The method according to claim 1, further comprising receiving an input of the magnification factor from the user of the mobile device.

3. The method according to claim 2, wherein the image data comprises the image displayed on the display and the mobile device processes the image data based on the location, size and the magnification factor to provide the area to the screen of the mobile device for display thereon.

4. The method according to claim 2, wherein the image data comprises content in the area to be displayed on the screen of the mobile device after processing by the computer device based on the location, the size and the magnification factor.

5. The method according to claim 1, wherein the magnification factor is transmitted from the mobile device to the computer device.

6. The method according to claim 1, wherein the magnification factor is predetermined for the mobile device.

7. The method according to claim 1, wherein the displayed area of the image displayed on the screen of the mobile device is updated as the image on the display under the control of the computer device is changed.

8. The method according to claim 1, wherein a plurality of mobile devices are communicatively coupled to the computer device, each mobile device receiving image data from the computer device and displaying an area of the image on its screen, the displayed area having a magnification factor of less than one or more than one compared to the image.

9. The method according to claim 8, wherein each mobile device displays a different area on its respective screen.

10. A mobile device comprising a processing system, a user interface and a display screen, the mobile device being configured to:
receive an input of a location and a size of an area of an image displayed on a display of a computer device coupled to the mobile device, the area being smaller than the image, the location and the size being transmitted from the mobile device to the computer device and being displayed as a visual indicator under a control of a user of the mobile device on the image on the display under a control of the computer device;

receive image data relating to the image from the computer device;

display the area of the image on the screen of the mobile device, the displayed area having a magnification factor of less than one or more than one compared to the image;

receive a user input to make a change to a content of the image being displayed on the displayed area having the magnification factor on the screen of the mobile device;

transmit, from the mobile device to the computer device, information relating to the change of the content of the image; and update the image on the display to display the content changed by the user of the mobile device,
wherein a different portion of the updated image is viewable by a different user on a screen of a different mobile device communicatively coupled to the computer device, and
wherein the portion of the image viewable by the user and the different portion of the image viewable by the different user are each outlined by a different rectangular box on the display.

11. The mobile device according to claim 10, wherein the image data comprises the image displayed on the display and the mobile device processes the image data based on the location, the size, and the magnification factor to provide the area to the screen of the mobile device for display thereon.

12. The mobile device according to claim 10, wherein the image data comprises the area to be displayed on the screen of the mobile device after processing by the computer device based on the location, the size, and the magnification factor.

13. A computer device comprising:
a display controller configured to display an image on a display coupled to the computer device;
a communication transceiver configured to communicatively couple to a mobile device having a screen and to transmit image data relating to the image to the mobile device, the image data enabling the mobile device to display an area of the image on its screen, the area having a magnification factor of less than one or more than one compared to the image,
wherein the communication transceiver is configured to receive a location and size of the area of the image and the magnification factor for the area, and to receive, from the mobile device, information relating to a change of content of the image to be made by a user of the mobile device to change the content of the image being displayed on the screen of the mobile device having the magnification factor on the screen of the mobile device;
wherein the display controller is configured to display on the image at least one of:
a visual indicator under the control of a user of the mobile device, the visual indicator indicating the location and size of the area of the image; or
an update of the image with the content changed by an input from the user; and
wherein the display controller updates the image on the display based on the display data and on the information relating to the change of content received from the mobile device,
wherein a different portion of the updated image is viewable by a different user on a screen of a different mobile device communicatively coupled to the computer device, and wherein the portion of the image viewable by the user and the different portion of the image viewable by the different user are each outlined by a different rectangular box on the display.

14. The computer device according to claim 13, further comprising a processor configured to process the image based on the location, the size and magnification factor to provide the image data comprising the area at the location and the magnification factor to be displayed on the screen of the mobile device.

15. The computer device according to claim 13, wherein the communication transceiver is configured to communicatively couple to a plurality of mobile devices and to receive, from one or more of the plurality of mobile devices, the location of the area of the image and the magnification factor for the area for display on the screen of the respective mobile device, the processor being configured to process the image based on at least the location and the magnification factor for the respective mobile device, to provide the image data comprising the area at the location and magnification factor to be displayed on a screen of the respective mobile device, and the communication means being configured to transmit the respective image data to the respective mobile device to enable the respective mobile device to display the area of the image on its screen.

16. A system comprising:
the computer device according to claim 13; and
at least one mobile device according to claim 10 connected to the computer device.

17. The system according to claim 16, wherein the at least one mobile device is connected to the computer device by at least one of a wireless connection or a wired connection.

18. The system according to claim 16, wherein the at least one mobile device is connected to the computer device via a network connection.

* * * * *